J. B. CARYL.
JOURNAL BOX AND BEARING.

No. 63,609.　　　　　　　　Patented Apr. 9, 1867.

Witnesses:
P. T. Dodge
Alexander Kinstead

Inventor:
James B. Caryl.
By Dodge Mum

United States Patent Office.

JAMES B. CARYL, OF CANDOR, NEW YORK.

*Letters Patent No. 63,609, dated April 9, 1867.*

---

IMPROVEMENT IN JOURNAL-BOX AND BEARING.

---

*The Schedule referred to in these Letters Patent and making part of the same.*

---

TO ALL WHOM IT MAY CONCERN:

Be it known that I, JAMES B. CARYL, of Candor, in the county of Tioga, and State of New York, have invented certain new and useful improvements in Journal-Boxes and Bearings; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel manner of constructing journal-boxes and arranging friction-rollers therein, in such a manner as to substitute rolling for rubbing surfaces, to decrease friction.

Figure 1:
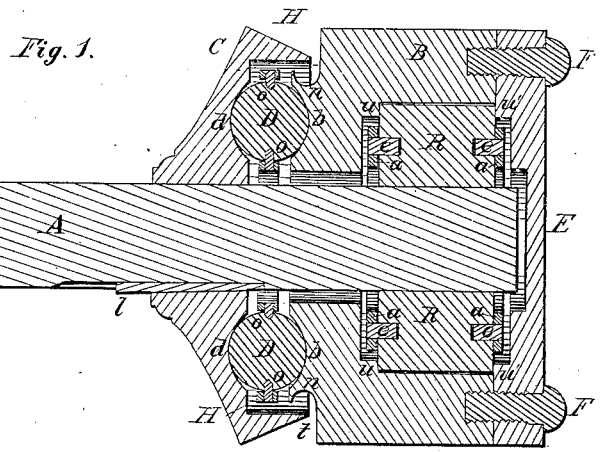

Figure 1 is a longitudinal section of my improved apparatus with a journal inserted.

Figures 2, 3, 4, and 5, are views of portions shown detached.

It is well known that much of the power applied to machinery of all kinds is absorbed by the friction of the journals and their bearings, the surfaces of these parts rubbing or sliding on each other, where they come in contact, and that this rubbing of the parts upon each other causes a constant wearing away of their surfaces often heating, and greatly injuring them, especially when run at a high speed, and where heavy shafts and wheels are used, the weight of which tends to press out or displace the oil or other lubricating material from between the rubbing or bearing surfaces. It is also known that when surfaces are caused to roll upon each other, much less friction is produced than when the surfaces slide or rub one upon the other. Many plans have been devised for applying these principles in machinery, to lessen the friction and wear, and economize power, but so far as I am aware with but limited success. The object of my invention is to reduce the friction in such cases to the least possible amount, by so constructing the parts as to substitute rolling for the rubbing surfaces usually employed.

Figure 2:
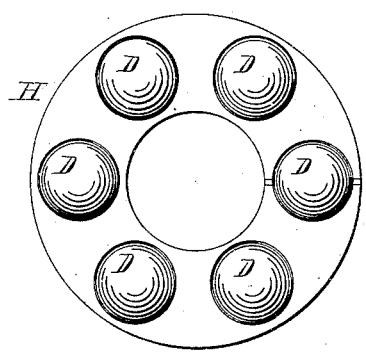
Figure 3:
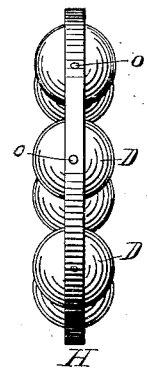
Figure 4:
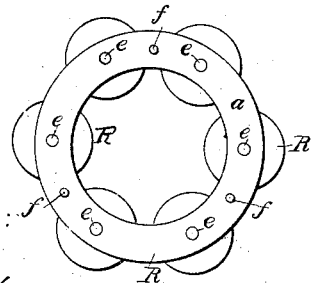
Figure 5:
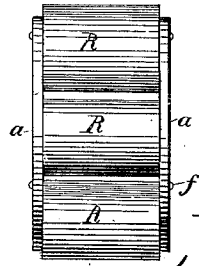

To accomplish this object, I construct my journal-box, B, with an interior cavity or circular chamber, considerably larger in diameter than the journal which is to have its bearing therein, as shown in section in fig. 1. I then provide a series of rollers, R, of such a diameter that when arranged in a circle, as shown in fig. 4, they will just slip endwise into the chamber of the box B, and fill the space surrounding the journal, as shown in fig. 1. These rollers R are held together by journals, $e$, on each end, having their bearings in a ring, A, at each end, as shown in fig. 4, which is an end view of the rollers with a ring, A, applied. The two rings A are held together by small rods, $f$, which extend from one to the other, as shown in fig. 5, which is a face view of the rollers and rings united. When the rollers R are inserted within the box B, as shown in fig. 1, it will be observed that a small portion of their inner ends abuts against a shoulder, $u$, which prevents any lateral movement of the rollers in that direction. To the end of the box B I then secure a cap or plate, E, by means of bolts F, as shown in fig. 1. This cap E is recessed on its inner face, as shown, to leave a space between it and the end of the journal A, and also between it and the ends of the rollers R, leaving a small shoulder, $u'$, to bear against the outer ends of said rollers, to prevent any lateral movement of the same towards the cap E. It will be understood that the shoulders $u$ and $u'$, (which constitute the only rubbing surfaces in my improved device,) should be made as small as possible, and answer the desired purpose, so as to reduce the rubbing surfaces to the minimum amount. In order to prevent the friction which might be caused by the lateral movement or play of the shaft or journal A, I construct the inner shoulder of the box B with a groove, $b$, as shown in fig. 1. I then secure to the shaft or journal A a collar C, having a similar groove, $d$, formed on its face adjoining the box B. I then provide a series of balls, D, which are arranged in a circle and held in position by being journalled in holes in a flat ring, H, as represented in figs. 2 and 3, the former being a side and the latter an edge view of the same. These balls D are held in the ring H by small pins or journals, $o$, as shown in fig. 3; these journals $o$ being so located as to bring the axis of said balls D radial, as indicated by the dotted lines in fig. 2. This series of balls D being thus arranged, are placed between the collar C and the box B, as shown in fig. 1; the size of the balls D and their ring H being such as to cause the balls D to fit in the grooves $b$ and $d$. It will thus be seen that as the shaft A with its collar C revolves, the balls D will simply roll in the grooves $b$ and $d$, and prevent any friction from being generated between the faces of the collar and the box, and that thus rolling surfaces are substituted instead of rubbing surfaces at all points of the bearing, except between the ends of the rollers R and the shoulders $u$ and $u'$, as hereinbefore explained, thus reducing the rubbing surfaces to the least possible amount. The inner end of the box B is formed circular, and has a circumferential groove, $n$, formed thereon, as shown in fig. 1. The collar C is also provided with a projecting flange, $t$, which fits over the circular end of the box B, thus enclosing and covering the balls D and the adjoining circular end of the box, and thereby excluding dust and dirt as far as possible. It will of course be understood that my invention may be applied to all rotating shafts or journals, and that it may be applied with equal advantage where the journal is stationary, and a wheel is arranged to revolve thereon, the arrangement of the anti-friction rollers and balls being the same in both cases. The invention is alike applicable to the journals of railway cars, carriages, and vehicles of all kinds, and also to all styles of shafting and machinery. It will of course be understood that the rollers R and the balls D, and also the surfaces of the parts with which they come in contact, should be made as smooth and hard as possible to prevent wear and avoid friction.

Having thus described my invention, what I claim, is—

1. The journal-box B, having the rollers R arranged as shown, in combination with the balls D, mounted in the ring H, and arranged to operate in the grooves in the end of the box and collar C, substantially as shown and described.

2. I claim providing the inner end of the box B with the circumferential groove $n$, and arranging the flange $t$ of the collar C to project over the same, substantially as shown and described.

JAMES B. CARYL.

Witnesses:
   J. S. KINNEY,
   JOHN RYAN.